US008248547B2

(12) United States Patent
Kim

(10) Patent No.: US 8,248,547 B2
(45) Date of Patent: Aug. 21, 2012

(54) VERTICAL ELECTRIC FIELD TYPE LIQUID CRYSTAL DISPLAY AND DRIVING METHOD COMPRISING APPLYING A FORMAT VOLTAGE AND A DRIVING VOLTAGE TO A LIQUID CRYSTAL WITHOUT AN ALIGNMENT LAYER

(75) Inventor: Jinmahn Kim, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 344 days.

(21) Appl. No.: 12/576,683

(22) Filed: Oct. 9, 2009

(65) Prior Publication Data

US 2010/0091209 A1 Apr. 15, 2010

(30) Foreign Application Priority Data

Oct. 9, 2008 (CN) .......................... 2008 1 0223738

(51) Int. Cl.
*G02F 1/133* (2006.01)
*G02F 1/1337* (2006.01)

(52) U.S. Cl. .......................................... 349/33; 349/191

(58) Field of Classification Search .................... 349/33, 349/34, 92, 94, 123, 124, 127, 187, 191
See application file for complete search history.

(56) References Cited

U.S. PATENT DOCUMENTS

2006/0146237 A1 * 7/2006 Minoura et al. .............. 349/113
2006/0152457 A1 * 7/2006 Kitaoka et al. .................. 345/87

* cited by examiner

*Primary Examiner* — Mark Robinson
*Assistant Examiner* — Paul Lee
(74) *Attorney, Agent, or Firm* — Ladas & Perry LLP

(57) ABSTRACT

The invention relates to a vertical electric field type of the liquid crystal display and a driving method. The method comprising: during displaying each picture, driving first pixel and second pixel at adjacent two rows and the same column, comprising: step 101 of applying a format voltage to the first pixel and vertically arranging liquid crystal in the first pixel to form brightness mode; step 102 of applying a driving voltage to the first pixel to display a picture; step 103 of applying a format voltage to the second pixel and vertically arranging a liquid crystal in the second pixel to form brightness mode; step 104 of applying a driving voltage to second pixel to display a picture. The driving method employs a format voltage to form a brightness mode and employs a driving voltage to display a picture, enabling to form a brightness mode without alignment film.

20 Claims, 6 Drawing Sheets

VERTICAL ELECTRIC FIELD TYPE LIQUID CRYSTAL DISPLAY AND DRIVING METHOD COMPRISING APPLYING A FORMAT VOLTAGE AND A DRIVING VOLTAGE TO A LIQUID CRYSTAL WITHOUT AN ALIGNMENT LAYER

FIELD OF THE INVENTION

The present invention relates to a vertical electric field type of the liquid crystal display and a driving method therefor, and relates to: the liquid crystal panel employing a liquid crystal which is arranged by vertical electric field and whose dielectric permittivity anisotropic is positive to display a picture, and having no alignment film; and the driving method therefor.

DESCRIPTION OF THE RELATED ART

Liquid crystal display (LCD) is a kind of flat panel display (FPD) which uses the electric field formed by a pixel electrode and a common electrode in the liquid crystal panel to control the arrangement for the liquid crystals so as to display a picture. The liquid crystal panel is composed of an array substrate and a color filter substrate, and the liquid crystal is sandwiched between the array substrate and the color filter substrate. According to the direction of the electric field for arranging the liquid crystal, the liquid crystal display is classified into the horizontal electric field type of the liquid crystal display and the vertical electric field type of the liquid crystal display.

The horizontal electric field type of the liquid crystal display includes the in-plane switching (IPS) type of the liquid crystal display and the fringe field switching (FFS) type of the liquid crystal display. The horizontal electric field type of the liquid crystal display forms a horizontal electric field through the common electrode and the pixel electrode on the array substrate, and arranges the liquid crystal whose dielectric permittivity anisotropic is positive between the array substrate and the color filter substrate, so as to display a picture.

The vertical electric field type of the liquid crystal display includes the twist nematic (TN) type of the liquid crystal display and the vertical alignment (VA) type of the liquid crystal display. The twist nematic type of the liquid crystal display forms a vertical electric field through the pixel electrode on the array substrate and the common electrode on the color filter substrate, and arranges the liquid crystal molecules whose dielectric permittivity anisotropic is positive between the array substrate and the color filter substrate, so as to display a picture. The vertical alignment type of the liquid crystal display forms a vertical electric field through the pixel electrode on the array substrate and the common electrode on the color filter substrate, and arranges the liquid crystal whose dielectric permittivity anisotropic is negative between the array substrate and the color filter substrate, so as to display a picture. The vertical alignment type of the liquid crystal display has a better contrast than other liquid crystal panels. However, it is necessary for the vertical alignment type of the liquid crystal display to modify the pixels so as to arrange liquid crystal molecules with a specific rule in a certain range, that is, to form a domain.

According to the manner of forming the domain, the vertical alignment type of the liquid crystal display is further classified into the multi-domain vertical alignment (MVA) type of the liquid crystal display, the patterned vertical alignment (PVA) type of the liquid crystal display, and the advanced super view (ASV) type of the liquid crystal display.

By applying a vertical electric field and with the protrusion within the pixels, the multi-domain vertical alignment type of the liquid crystal display arranges the liquid crystal molecules in a specific direction, hence a domain is formed. By patterning the pixel electrode and the common electrode and forming a slightly inclined vertical electric field by using the patterned electrode, the patterned vertical alignment type of the liquid crystal display arranges the liquid crystal molecules in a specific direction, hence a domain is formed. The advanced super view type of the liquid crystal display also employs the pixel electrode and the common electrode which have been patterned respectively to form a domain.

The existing driving method for the liquid crystal display comprises: step 1 of previously arranging the liquid crystal molecules through the alignment film without voltage being applied, so as to form a brightness mode; and step 2 of arranging the liquid crystal molecules with a voltage being applied, so as to display a picture.

For the horizontal electric field type of the liquid crystal display, in order to form a brightness mode such as the normal dark mode or the normal light mode, it requires to horizontally arrange the liquid crystal molecules through the alignment film previously. However, the inter-layer structure of the horizontally arranged liquid crystal molecules is very instable as compared with that of the vertically arranged liquid crystal molecule, thus the formed brightness mode is vulnerable to be damaged.

For the twist nematic type of the liquid crystal display, in order to form a brightness mode, it also requires to horizontally arrange the liquid crystal molecules in advance through the alignment film, thus it also has the defect that the brightness mode is vulnerable to be damaged.

For the vertical alignment type of the liquid crystal display, after the liquid crystal whose dielectric permittivity anisotropic is negative is injected between the substrates that are formed with the vertical alignment film, the isotropic process is performed on the liquid crystal to vertically arrange the liquid crystal molecules, so as to form to the brightness mode. The arrangement of the vertically arranged liquid crystal molecules is relatively stable as compared with that of the horizontally arranged liquid crystal molecules. However, the price of the liquid crystal whose dielectric permittivity anisotropic is negative is twice that of the liquid crystal whose dielectric permittivity anisotropic is positive, thus the fabrication cost thereof is increased. Also, for the vertical alignment type of the liquid crystal display, it requires to form a domain, thus the additional fabrication process is added and the fabrication cost is further increased.

SUMMARY OF THE INVENTION

The object of the present invention is to provide a vertical electric field type of the liquid crystal display and a driving method therefor to overcome a defect of the liquid crystal of high price employed in the present vertical alignment type of the liquid crystal display, and a defect of the brightness mode being easily damaged in the present horizontal electric field type of the liquid crystal display and the present twist nematic type of the liquid crystal display.

To achieve the above object, an embodiment of the present invention provides a driving method for a vertical electric field type of the liquid crystal display comprising: in the process of displaying each picture, driving a first pixel and a second pixel at adjacent two rows and the same column comprises:

step 101 of applying a format voltage to the first pixel and vertically arranging a liquid crystal whose dielectric permittivity anisotropic is positive in the first pixel without alignment film so as to form a brightness mode;

step 102 of applying a driving voltage to the first pixel and forming a plurality of domains in the first pixel so as to display a picture;

step 103 of applying a format voltage to the second pixel and vertically arranging a liquid crystal whose dielectric permittivity anisotropic is positive in the second pixel without alignment film so as to form a brightness mode; and step 104 of applying a driving voltage to the second pixel and forming a plurality of domains in the second pixel so as to display a picture.

In an embodiment of the present invention, in the process of displaying each picture, driving the first pixel and the second pixel at the adjacent two rows and the same column particularly includes:

step 201 of applying a positive format voltage to the first pixel and vertically arranging a liquid crystal whose dielectric permittivity anisotropic is positive in the first pixel without alignment film so as to form a brightness mode;

step 202 of applying a positive driving voltage to the first pixel and forming a plurality of domains in the first pixel so as to display a picture;

step 203 of applying a negative format voltage to the second pixel and vertically arranging a liquid crystal whose dielectric permittivity anisotropic is positive in the second pixel without alignment film so as to form a brightness mode; and step 204 of applying a negative driving voltage to the second pixel and forming a plurality of domains in the second pixel so as to display a picture.

In an embodiment of the present invention, in the process of displaying each picture, driving the first pixel and the second pixel at the adjacent two rows and the same column particularly includes:

step 301 of applying a positive format voltage to the first pixel and vertically arranging a liquid crystal whose dielectric permittivity anisotropic is positive in the first pixel without alignment film so as to form a brightness mode;

step 302 of applying a negative driving voltage to the first pixel and forming a plurality of domains in the first pixel so as to display a picture;

step 303 of applying a negative format voltage to the second pixel and vertically arranging a liquid crystal whose dielectric permittivity anisotropic is positive in the second pixel without alignment film so as to form a brightness mode; and step 304 of applying a positive driving voltage to the second pixel and forming a plurality of domains in the second pixel so as to display a picture.

In an embodiment of the present invention, in the process of displaying each picture, driving the first pixel and the second pixel at the adjacent two rows and the same column particularly includes:

step 401 of applying a positive format voltage to the first pixel and vertically arranging a liquid crystal whose dielectric permittivity anisotropic is positive in the first pixel without alignment film so as to form a brightness mode;

step 402 of applying a negative driving voltage to the first pixel and forming a plurality of domains in the first pixel so as to display a picture;

step 403 of applying a positive format voltage to the second pixel and vertically arranging a liquid crystal whose dielectric permittivity anisotropic is positive in the second pixel without alignment film so as to form a brightness mode; and step 404 of applying a negative driving voltage to the second pixel and forming a plurality of domains in the second pixel so as to display a picture.

In an embodiment of the present invention, after the step 102, the method further comprises:

step 503 of applying a reset voltage to the first pixel and vertically rearranging the liquid crystal whose dielectric permittivity anisotropic is positive in the first pixel so as to resume said brightness mode;

after the step 104, the method further comprises:

step 506 of applying a reset voltage to the second pixel and vertically rearranging the liquid crystal whose dielectric permittivity anisotropic is positive in the second pixel so as to resume said brightness mode;

In an embodiment of the present invention, in the process of displaying each picture, driving the first pixel and the second pixel at the adjacent two rows and the same column particularly includes:

step 601 of applying a positive format voltage to the first pixel and vertically arranging a liquid crystal whose dielectric permittivity anisotropic is positive in the first pixel without alignment film so as to form a brightness mode;

step 602 of applying a positive driving voltage to the first pixel and forming a plurality of domains in the first pixel so as to display a picture;

step 603 of applying a negative reset voltage to the first pixel and vertically rearranging the liquid crystal whose dielectric permittivity anisotropic is positive in the first pixel so as to resume said brightness mode;

step 604 of applying a negative format voltage to the second pixel and vertically arranging a liquid crystal whose dielectric permittivity anisotropic is positive in the second pixel without alignment film so as to form a brightness mode;

step 605 of applying a negative driving voltage to the second pixel and forming a plurality of domains in the second pixel so as to display a picture; and step 606 of applying a positive reset voltage to the second pixel and vertically rearranging the liquid crystal whose dielectric permittivity anisotropic is positive in the second pixel so as to resume said brightness mode.

In an embodiment of the present invention, in the process of displaying each picture, driving the first pixel and the second pixel at the adjacent two rows and the same column particularly includes:

step 701 of applying a positive format voltage to the first pixel and vertically arranging a liquid crystal whose dielectric permittivity anisotropic is positive in the first pixel without alignment film so as to form a brightness mode;

step 702 of applying a negative driving voltage to the first pixel and forming a plurality of domains in the first pixel so as to display a picture;

step 703 of applying a negative reset voltage to the first pixel and vertically rearranging the liquid crystal whose dielectric permittivity anisotropic is positive in the first pixel so as to resume said brightness mode;

step 704 of applying a negative format voltage to the second pixel and vertically arranging a liquid crystal whose dielectric permittivity anisotropic is positive in the second pixel without alignment film so as to form a brightness mode;

step 705 of applying a positive driving voltage to the second pixel and forming a plurality of domains in the second pixel so as to display a picture; and step 706 of applying a positive reset voltage to the second pixel and vertically rearranging the liquid crystal whose dielectric permittivity anisotropic is positive in the second pixel so as to resume said brightness mode.

In an embodiment of the present invention, in the process of displaying each picture, driving the first pixel and the second pixel at the adjacent two rows and the same column particularly includes:

step 801 of applying a positive format voltage to the first pixel and vertically arranging a liquid crystal whose dielectric permittivity anisotropic is positive in the first pixel without alignment film so as to form a brightness mode;

step 802 of applying a negative driving voltage to the first pixel and forming a plurality of domains in the first pixel so as to display a picture;

step 803 of applying a positive reset voltage to the first pixel and vertically rearranging the liquid crystal whose dielectric permittivity anisotropic is positive in the first pixel so as to resume said brightness mode;

step 804 of applying a positive format voltage to the second pixel and vertically arranging a liquid crystal whose dielectric permittivity anisotropic is positive in the second pixel without alignment film so as to form a brightness mode;

step 805 of applying a negative driving voltage to the second pixel and forming a plurality of domains in the second pixel so as to display a picture; and step 806 of applying a positive reset voltage to the second pixel and vertically rearranging the liquid crystal whose dielectric permittivity anisotropic is positive in the second pixel so as to resume said brightness mode.

In an embodiment of the present invention, after the step 503, the method further comprises:

step 904 of applying a format voltage to the first pixel and maintaining said brightness mode in the first pixel;

after the step 506, the method further comprises:

step 908 of applying a format voltage to the second pixel and maintaining said brightness mode in the second pixel.

In an embodiment of the present invention, in the process of displaying each picture, driving the first pixel and the second pixel at the adjacent two rows and the same column particularly includes:

step 1001 of applying a positive format voltage to the first pixel and vertically arranging a liquid crystal whose dielectric permittivity anisotropic is positive in the first pixel without alignment film so as to form a brightness mode;

step 1002 of applying a positive driving voltage to the first pixel and forming a plurality of domains in the first pixel so as to display a picture;

step 1003 of applying a negative reset voltage to the first pixel and vertically rearranging the liquid crystal whose dielectric permittivity anisotropic is positive in the first pixel so as to resume said brightness mode;

step 1004 of applying a negative format voltage to the first pixel and maintaining said brightness mode in the first pixel;

step 1005 of applying a negative format voltage to the second pixel and vertically arranging a liquid crystal whose dielectric permittivity anisotropic is positive in the second pixel without alignment film so as to form a brightness mode;

step 1006 of applying a negative driving voltage to the second pixel and forming a plurality of domains in the second pixel so as to display a picture;

step 1007 of applying a positive reset voltage to the second pixel and vertically rearranging the liquid crystal whose dielectric permittivity anisotropic is positive in the second pixel so as to resume said brightness mode; and step 1008 of applying a positive format voltage to the second pixel and maintaining said brightness mode in the second pixel.

In an embodiment of the present invention, in the process of displaying each picture, driving the first pixel and the second pixel at the adjacent two rows and the same column particularly includes:

step 1101 of applying a positive format voltage to the first pixel and vertically arranging a liquid crystal whose dielectric permittivity anisotropic is positive in the first pixel without alignment film so as to form a brightness mode;

step 1102 of applying a negative driving voltage to the first pixel and forming a plurality of domains in the first pixel so as to display a picture;

step 1103 of applying a negative reset voltage to the first pixel and vertically rearranging the liquid crystal whose dielectric permittivity anisotropic is positive in the first pixel so as to resume said brightness mode;

step 1104 of applying a negative format voltage to the first pixel and maintaining said brightness mode in the first pixel;

step 1105 of applying a negative format voltage to the second pixel and vertically arranging a liquid crystal whose dielectric permittivity anisotropic is positive in the second pixel without alignment film so as to form a brightness mode;

step 1106 of applying a positive driving voltage to the second pixel and forming a plurality of domains in the second pixel so as to display a picture;

step 1107 of applying a positive reset voltage to the second pixel and vertically rearranging the liquid crystal whose dielectric permittivity anisotropic is positive in the second pixel so as to resume said brightness mode; and step 1108 of applying a positive format voltage to the second pixel and maintaining said brightness mode in the second pixel.

In an embodiment of the present invention, in the process of displaying each picture, driving the first pixel and the second pixel at the adjacent two rows and the same column particularly includes:

step 1201 of applying a positive format voltage to the first pixel and vertically arranging a liquid crystal whose dielectric permittivity anisotropic is positive in the first pixel without alignment film so as to form a brightness mode;

step 1202 of applying a negative driving voltage to the first pixel and forming a plurality of domains in the first pixel so as to display a picture;

step 1203 of applying a positive reset voltage to the first pixel and vertically rearranging the liquid crystal whose dielectric permittivity anisotropic is positive in the first pixel so as to resume said brightness mode;

step 1204 of applying a positive format voltage to the first pixel and maintaining said brightness mode in the first pixel;

step 1205 of applying a positive format voltage to the second pixel and vertically arranging a liquid crystal whose dielectric permittivity anisotropic is positive in the second pixel without alignment film so as to form a brightness mode;

step 1206 of applying a negative driving voltage to the second pixel and forming a plurality of domains in the second pixel so as to display a picture;

step 1207 of applying a positive reset voltage to the second pixel and vertically rearranging the liquid crystal whose dielectric permittivity anisotropic is positive in the second pixel so as to resume said brightness mode;

step 1208 of applying a positive format voltage to the second pixel and maintaining said brightness mode in the second pixel.

To achieve the above object, another embodiment of the present invention also provides a vertical electric field type of the liquid crystal display which drives according to the driving method of the present invention.

As compared with the existing driving method for the liquid crystal panel, the driving method for the liquid crystal panel according to the first embodiment employs a manner in which the brightness mode is formed by a format voltage that is higher than a reset voltage, rather than the manner in the prior art in which the brightness mode is formed by the rubbed alignment film or the vertical alignment film with no voltage being applied. Hence the brightness mode can be formed without the alignment film, which decreases the process of forming the alignment film and the process of rubbing the alignment film from the view of the liquid crystal panel fabrication, and simplifies the fabrication process of the liquid crystal panel.

In addition, the driving method according to the first embodiment is same as the blinking driving method in which a black picture is inserted between each picture to prevent the streaking phenomenon, since both of them has the effect of streaking prevention and no additional circuit related to the blinking is needed.

In addition, in the driving method according to the first embodiment, the liquid crystal can be forcefully and vertically arranged with the strong electric field formed by the format voltage and the common voltage, thus forming a gray color which is very close to the gray color formed by the vertical alignment type of the liquid crystal display, and having a relatively high contrast.

The technical solution according to embodiments of the present invention will be further described in details below with reference to the drawings and the embodiments.

DESCRIPTION OF THE PREFERRED EMBODIMENTS

The First Embodiment

Figure 1:
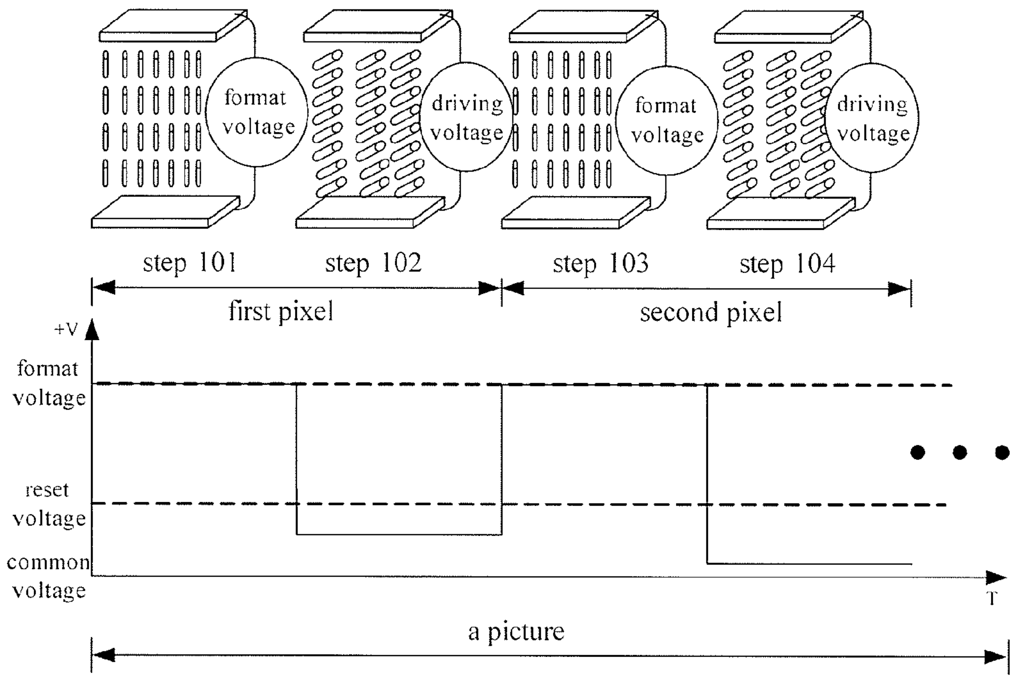
FIG. 1 is a schematic diagram for a driving method according to the first embodiment of the present invention.

The vertical electric field type of the liquid crystal display according to the first embodiment comprises a liquid crystal panel which can form a plurality of domains, wherein the liquid crystal panel is composed of an array substrate equipped with a pixel electrode, and a color filter substrate equipped with a common electrode, also the liquid crystal whose dielectric permittivity anisotropic is positive is set between the array substrate and the color filter substrate.

Since the liquid crystal molecule has an anisotropic structure, the photoelectric effect for the liquid crystal molecules would be different due to the different directions. Briefly speaking, the photoelectric effects such as the dielectric permittivity $\in$ and the refractive index n for the liquid crystal molecule are anisotropic.

In an embodiment of the present invention, dielectric permittivity is divided into the components in two directions, which respectively is $\in_{//}$ (the component that is parallel with a director) and $\in_{\perp}$ (the component that is perpendicular to the director). The so-called director is the average directing of a group of areal liquid crystal molecules, that is, the average direction of a group of areal liquid crystal molecules. The liquid crystal for which $\in_{//}>\in_{\perp}$ is referred to as the liquid crystal whose dielectric permittivity anisotropic is positive and can be horizontally arranged. The liquid crystal for which $\in_{//}<\in_{\perp}$ is referred to as the liquid crystal whose dielectric permittivity anisotropic is negative and can be vertically arranged. When externally applied with electric field, according to whether dielectric permittivity anisotropic of the liquid crystal molecules is positive or negative, it can be determined whether the rotation direction of the liquid crystal molecules is parallel with or perpendicular to the electric field. In addition, the larger the dielectric permittivity anisotropic $\Delta\in(=\in_{//}-\in_{\perp})$ of the liquid crystal is, the smaller the threshold voltage for the liquid crystal is.

In an embodiment of the present invention, the refractive index is divided into the vectors in two directions, which respectively is $n_{//}$(the vector that is parallel with a director) and $n_{\perp}$ (the vector that is perpendicular to the director). In addition, there are two different definitions for the refractive index with respect to the uniaxial crystalloid, one of which is no that refers to the refractive index to the ordinary ray, and the other one of which is ne that refers to the refractive index to the extraordinary ray. The ordinary ray is the ray for which the electric field component of the wave is perpendicular to the ray axis, and the extraordinary ray is the ray for which the electric field component of the wave is parallel with the ray axis. Birefringence Δn is defined as ne−no, that is, the difference between two refractive indexes.

As compared with the existing horizontal electric field type of the liquid crystal display and twist nematic type of the liquid crystal display, neither of the array substrate and the color filter substrate in the liquid crystal panel according to the first embodiment creates alignment film, nor includes a rubbing process for rubbing the alignment film, thus the fabrication process for the liquid crystal panel is simplified. As compared with the existing vertical alignment type of the liquid crystal display, the liquid crystal panel according to the first embodiment employs the liquid crystal whose dielectric permittivity anisotropic is positive and whose price is lower, thus the material cost is reduced as compared with the fabrication of the vertical alignment type of the liquid crystal display, hence the fabrication cost for the liquid crystal panel can be decreased.

FIG. 1 is a schematic diagram for a driving method according to the first embodiment of the present invention. As shown in FIG. 1, in the process of displaying each picture, driving a first pixel and a second pixel at the adjacent two rows and the same column includes:

step 101 of applying a format voltage to the first pixel and vertically arranging liquid crystal whose dielectric permittivity anisotropic is positive in the first pixel without alignment film so as to form a brightness mode. In an embodiment of the present invention, the voltage difference formed between the applied format voltage and common voltage is much larger than the threshold voltage for the liquid crystal, hence the liquid crystal molecules is forced to be vertically arranged under a strong electric field formed by the format voltage and the common voltage (as shown in step 101 of FIG. 1). In addition, in the FIG. 1, a reset voltage refers to a voltage of (common voltage±threshold voltage), that is, one reset voltage presents at each of the two sides of the common voltage respectively. Generally, the format voltage is provided by the pixel electrode on the array substrate, and the common voltage is provided by the common electrode on the color filter substrate.

step 102, after the step 101, of applying a driving voltage to the first pixel and forming a plurality of domains in the first pixel, so as to control the degree of the optical rotation by arranging the liquid crystal according to a specific rule, and to control the gray scale of the liquid crystal panel by the polarizer on both sides of the liquid crystal panel under the control of the driving voltage, and finally enabling the first pixel to display a corresponding bright point.

step 103, after the step 102, of applying a format voltage to the second pixel and vertically arranging a liquid crystal whose dielectric permittivity anisotropic is positive in the second pixel without alignment film so as to form a brightness mode;

step 104, after the step 103, of applying a driving voltage to the second pixel and forming a plurality of domains in the second pixel, so as to control the degree of the optical rotation by arranging the liquid crystal according to a specific rule, and to control the gray scale of the liquid crystal panel by the polarizer on both sides of the liquid crystal panel under the control of the driving voltage, and finally enabling the first pixel to display a corresponding bright point.

By repeating the above steps, the bright point displayed by each pixel constitutes a full picture when all the pixels on the liquid crystal is scanned, hence the display for a full picture is achieved.

In addition, the brightness mode often used in the liquid crystal panel is the normally dark mode. Since the liquid crystal whose dielectric permittivity anisotropic is positive is used in the first embodiment, the liquid crystal is horizontally arranged without electric field being applied. And since the inter-layer structure of horizontally arranged liquid crystal is instable, the normal dark mode can not be formed. However, since back light unit is also in the state of non-operation before the start of the liquid crystal display, no ray is emitted from the liquid crystal panel, thus it can be considered that the liquid crystal panel forms the normal dark mode.

As compared with the existing driving method for the liquid crystal panel, the driving method for the liquid crystal panel according to the first embodiment employs the manner in which the brightness mode is formed by a format voltage that is higher than a reset voltage, rather than the manner in the prior art in which the brightness mode is formed by the rubbed alignment film or the vertical alignment film without voltage being applied. Hence the brightness mode can be formed without the alignment film, which removes the process of forming the alignment film and the process of rubbing the alignment film from the view of the liquid crystal panel fabrication, and simplifies the fabrication process of the liquid crystal display.

In addition, the driving method according to the first embodiment is same as the blinking driving method in which a black picture is inserted between each picture to prevent the streaking phenomenon. Both of them has the effect of streaking prevention and no additional circuit related to the blinking is needed.

In addition, in the driving method according to the first embodiment, the liquid crystal can be forced to be vertically arranged with the strong electric field formed by the format voltage and the common voltage, thus forming a gray color which is close to the gray color formed by the vertical alignment type of the liquid crystal display, and having a relatively high contrast.

In the first embodiment, the used dielectric permittivity anisotropic of the liquid crystal ranges from 4~8. The birefringence of the liquid crystal being used ranges from 0.36~0.45, and it is preferable to use the liquid crystal whose birefringence ranges from 0.40~0.45.

In addition, when each picture is displayed according to driving method of the first embodiment, the liquid crystal is vertically arranged with the format voltage and then the picture is displayed with the driving voltage, thus the liquid crystal inside the liquid crystal panel is continuously changing the arrangement state thereof even if the liquid crystal panel displays same picture for a long time. Therefor, the after image due to the ion or contamination inside the liquid crystal attached between the liquid crystals or between the liquid crystal and the alignment film while the liquid crystal displays the same picture, can be improved.

The Second Embodiment

Figure 2:
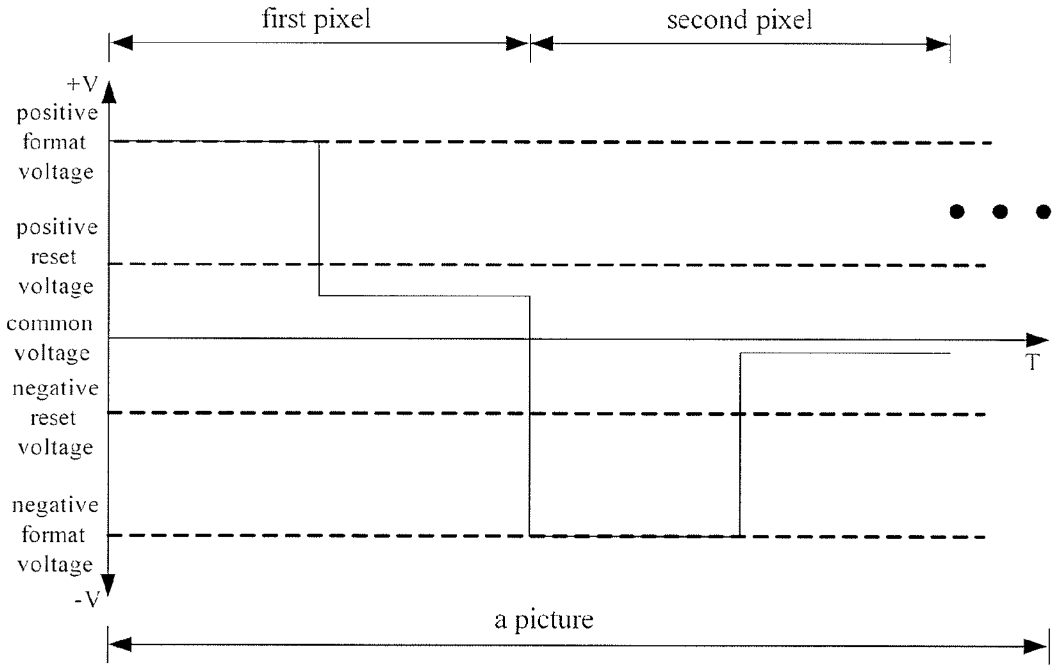
FIG. 2 is a schematic diagram for a driving method according to the second embodiment of the present invention.

FIG. 2 is a schematic diagram for a driving method according to the second embodiment of the present invention. As shown in FIG. 2, in the process of displaying each picture, driving the first pixel and the second pixel at the adjacent two rows and the same column particularly includes:

step 201 of applying a positive format voltage to the first pixel and vertically arranging the liquid crystal whose dielectric permittivity anisotropic is positive in the first pixel without alignment film so as to form a brightness mode. In an embodiment of the present invention, the voltage difference formed between the applied format voltage and common voltage is much larger than the positive reset voltage for the liquid crystal, hence the liquid crystal molecules is forced to be vertically arranged under a strong electric field that is formed by the format voltage and common voltage. In the FIG. 2, the reset voltage refers to a voltage of (common voltage±threshold voltage), that is, one reset voltage presents at each of the two sides of the common voltage respectively in which the voltage of (common voltage+threshold voltage) is a positive reset voltage, and the voltage of (common voltage−threshold voltage) is a negative reset voltage.

step 202, after the step 201, of applying a positive driving voltage to the first pixel and forming a plurality of domains in the first pixel, so as to control the degree of the optical rotation by arranging the liquid crystal according to a specific rule under the control of the positive driving voltage, and to control the gray scale of the liquid crystal panel by the polarizer on both sides of the liquid crystal panel, and finally enabling the first pixel to display a corresponding bright point.

step 203, after the step 202, of applying a negative format voltage to the second pixel and vertically arranging a liquid crystal whose dielectric permittivity anisotropic is positive in the second pixel without alignment film so as to form a brightness mode.

step 204, after the step 203, of applying a negative driving voltage to the second pixel and forming a plurality of domains in the second pixel, so as to control the degree of the optical rotation by arranging the liquid crystal according to a specific rule under the control of negative driving voltage, and to control the gray scale of the liquid crystal panel by the polarizer on both sides of the liquid crystal panel, and finally enabling the first pixel to display a corresponding bright point.

By repeating the above steps, the bright point displayed by each pixel constitutes a full picture when all the pixels on the liquid crystal are scanned, hence the display for a full picture is achieved.

The driving method according to the second embodiment employs a polarity reversal means of 《++−−》. Therefore, when this method is applied to a liquid crystal panel which has odd rows of pixels, the polarity reversal phenomenon is formed in the same pixel in the process of displaying the continuous two pictures, thus the defect that the capacitance formed when the former picture is displayed would hinder the display of the latter picture can be overcome. Generally, after a picture has been displayed, in order to maintain a corresponding electric field in the display of the next picture, a storage capacitance would be typically set in each pixel. This storage capacitance helps to maintain the electric field at the time of electric field maintenance; however, it hinders the charging process at the time of displaying picture.

In addition, the driving method according to the second embodiment employs a polarity reversal means of 《++−−》. However, the principle for the driving method of employing a polarity reversal means of 《−−++》 is same as that of the second embodiment, thus the details thereof are omitted herein.

The Third Embodiment

Figure 3:
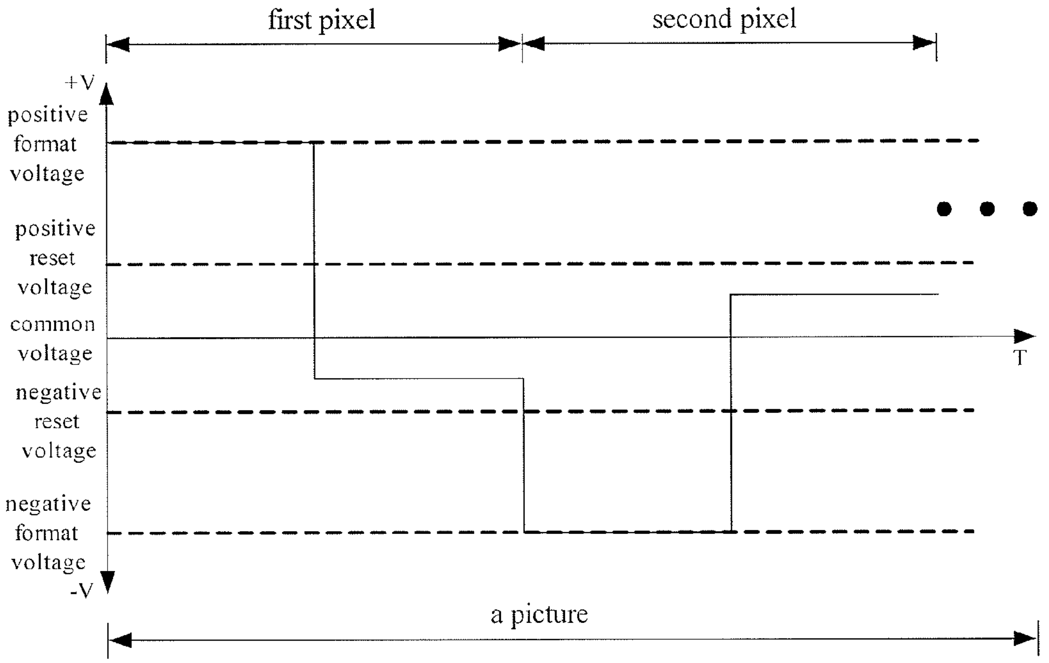
FIG. 3 is a schematic diagram for a driving method according to the third embodiment of the present invention.

FIG. 3 is a schematic diagram for a driving method according to the third embodiment of the present invention. As shown in FIG. 3, in the process of displaying each picture, driving the first pixel and the second pixel at the adjacent two rows and the same column particularly includes:

step 301 of applying a positive format voltage to the first pixel and vertically arranging a liquid crystal whose dielectric permittivity anisotropic is positive in the first pixel without alignment film so as to form a brightness mode. In an embodiment of the present invention, the voltage difference formed between the applied format voltage and common voltage is much larger than the positive reset voltage for the liquid crystal, hence the liquid crystal molecules is forced to be vertically arranged under a strong electric field that is formed by the format voltage and the common voltage. In the FIG. 3, the reset voltage refers to a voltage of (common voltage±threshold voltage), that is, one reset voltage presents at each of the two sides of the common voltage respectively in which the voltage of (common voltage+threshold voltage) is a positive reset voltage, and the voltage of (common voltage-threshold voltage) is a negative reset voltage.

step 302, after the step 301, of applying a negative driving voltage to the first pixel and forming a plurality of domains in the first pixel, so as to control the degree of the optical rotation by arranging the liquid crystal according to a specific rule under the control of the negative driving voltage, and to control the gray scale of the liquid crystal panel by the polarizer on both sides of the liquid crystal panel, and finally enabling the first pixel to display a corresponding bright point.

step 303, after the step 302, of applying a negative format voltage to the second pixel and vertically arranging a liquid crystal whose dielectric permittivity anisotropic is positive in the second pixel without alignment film so as to form a brightness mode.

step 304, after the step 303, of applying a positive driving voltage to the second pixel and forming a plurality of domains in the second pixel, so as to control the degree of the optical rotation by arranging the liquid crystal according to a specific rule under the control of positive driving voltage and to control the gray scale of the liquid crystal panel by the polarizer on both sides of the liquid crystal panel, and finally enabling the first pixel to display a corresponding bright point.

By repeating the above steps, the bright point displayed by each pixel constitutes a full picture when all the pixels on the liquid crystal are scanned, hence the display for a full picture is achieved.

The driving method according to the third embodiment employs a polarity reversal means of 《+−−+》. Therefore, when this method is applied to a liquid crystal panel which has even rows of pixels, the polarity reversal phenomenon is formed in the same pixel in the process of displaying the continuous two pictures, thus the defect that the capacitance formed when the former picture is displayed would hinder the display of the latter picture can be overcome.

In addition, the driving method according to the second embodiment applies a positive format voltage which is higher than the reset voltage to the pixels at step 201, thus it is possible for the capacitance formed at step 201 to hinder the process of displaying the bright point at step 202. However, the driving method according to the third embodiment applies a positive format voltage to the pixels at step 301, and applies a negative driving voltage at step 302, thus the defect that the storage capacitance may hinder the bright point display can be improved by the polarity reversal means.

In addition, the driving method according to the third embodiment employs a polarity reversal means of 《+−−+》. However, the principle for the driving method of employing a polarity reversal means of 《−++−》 is same as that of the third embodiment, thus the details thereof are omitted herein.

The Fourth Embodiment

Figure 4:
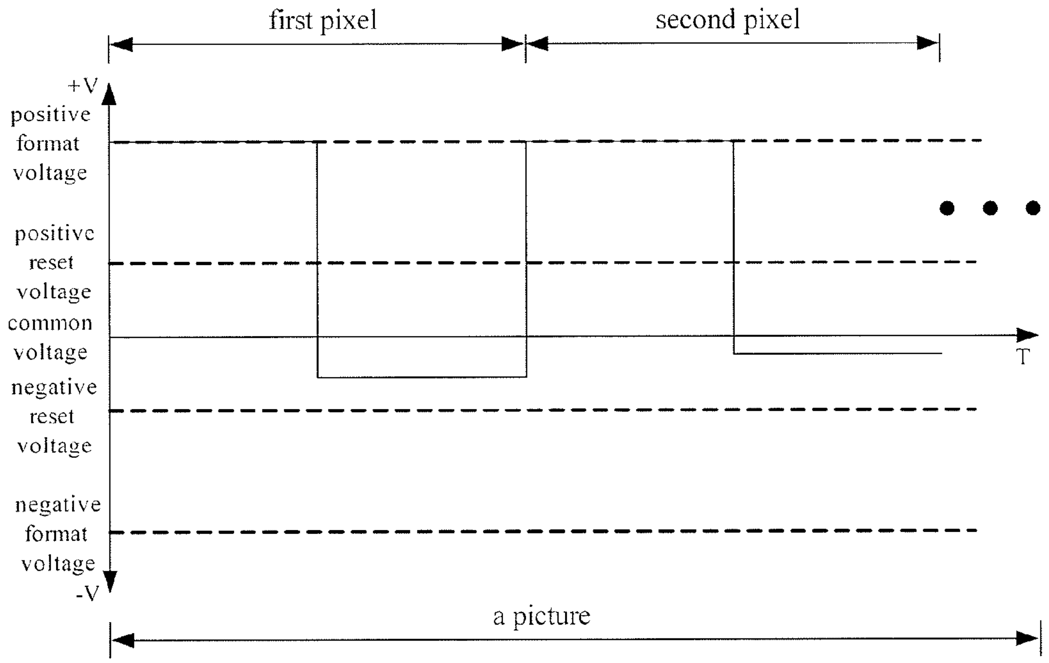
FIG. 4 is a schematic diagram for a driving method according to the fourth embodiment of the present invention.

FIG. 4 is a schematic diagram for a driving method according to the fourth embodiment of the present invention. As shown in FIG. 4, in the process of displaying each picture, driving the first pixel and the second pixel at the adjacent two rows and the same column particularly includes:

step 401 of applying a positive format voltage to the first pixel and vertically arranging liquid crystal whose dielectric permittivity anisotropic is positive in the first pixel without alignment film so as to form a brightness mode. In an embodiment of the present invention, the voltage difference formed between the applied format voltage and common voltage is much larger than the positive reset voltage for the liquid crystal, hence the liquid crystal molecules is forced to be vertically arranged under a strong electric field that is formed by the format voltage and the common voltage.

step 402, after the step 401, of applying a negative driving voltage to the first pixel and forming a plurality of domains in the first pixel, so as to control the degree of the optical rotation by arranging the liquid crystal according to a specific rule under the control of the negative driving voltage, and to control the gray scale of the liquid crystal panel by the polarizer on both sides of the liquid crystal panel, and finally enabling the first pixel to display a corresponding bright point.

step 403, after the step 402, of applying a positive format voltage to the second pixel and vertically arranging a liquid crystal whose dielectric permittivity anisotropic is positive in the second pixel without alignment film so as to form a brightness mode.

step 404, after the step 403, of applying a negative driving voltage to the second pixel and forming a plurality of domains in the second pixel, so as to control the degree of the optical rotation by arranging the liquid crystal according to a specific rule under the control of negative driving voltage and to control the gray scale of the liquid crystal panel by the polarizer on both sides of the liquid crystal panel, and finally enabling the first pixel to display a corresponding bright point.

By repeating the above steps, the bright point displayed by each pixel constitutes a full picture when all the pixels on the liquid crystal are scanned, hence the display for a full picture is achieved.

The driving method according to the fourth embodiment employs a polarity reversal means of 《+−+−》. Therefore, when this method is applied to a liquid crystal panel which has even or odd rows of pixels, the polarity reversal phenomenon is formed in the same pixel in the process of displaying the continuous two pictures, thus the defect that the capacitance formed when the former picture is displayed would hinder the display of the latter picture can be overcome.

In addition, the driving method according to the second embodiment applies a positive format voltage which is higher than the threshold voltage to the pixels at step 201, thus it is possible for the capacitance formed at step 201 to hinder the process of displaying the bright point at step 202. However, the driving method according to the fourth embodiment applies a positive format voltage to the pixels at step 401, and applies a negative driving voltage at step 402, thus the defect that the storage capacitance may hinder the bright point display can be improved by the polarity reversal means.

In addition, the driving method according to the third embodiment only can be applied to a liquid crystal panel which has even rows of pixels, while the driving method according to the fourth embodiment not only can be applied to a liquid crystal panel which has even rows of pixels, but also can be applied to a liquid crystal panel which has odd rows of pixels.

In addition, the driving method according to the fourth embodiment employs a polarity reversal means of 《+−+−》. However, the principle for the driving method of employing a polarity reversal means of 《−+−+》 is same as that of the fourth embodiment, thus the details thereof are omitted herein.

The Fifth Embodiment

Figure 5:
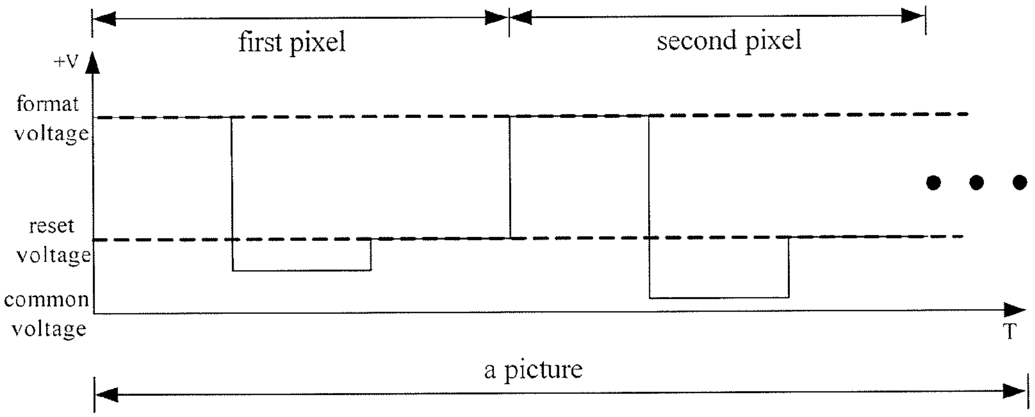
FIG. 5 is a schematic diagram for a driving method according to the fifth embodiment of the present invention.

FIG. 5 is a schematic diagram for a driving method according to the fifth embodiment of the present invention. As shown in FIG. 5, in the process of displaying each picture, driving the first pixel and the second pixel at the adjacent two rows and the same column includes:

step 501 of applying a format voltage to the first pixel and vertically arranging a liquid crystal whose dielectric permittivity anisotropic is positive in the first pixel without alignment film so as to form a brightness mode. In an embodiment of the present invention, the voltage difference formed between the applied format voltage and common voltage is much larger than the threshold voltage for the liquid crystal, hence the liquid crystal molecules is forced to be vertically arranged under a strong electric field that is formed by the format voltage and the common voltage. Generally, the format voltage is provided by the pixel electrode on the array substrate, and the common voltage is provided by the common electrode on the color filter substrate.

step 502, after the step 501, of applying a driving voltage to the first pixel and forming a plurality of domains in the first pixel, so as to control the degree of the optical rotation by arranging the liquid crystal according to a specific rule under the control of driving voltage and to control the gray scale of the liquid crystal panel by the polarizer on both sides of the liquid crystal panel, and finally enabling the first pixel to display a corresponding bright point.

step 503, after the step 502, of applying a reset voltage to the first pixel and vertically rearranging the liquid crystal whose dielectric permittivity anisotropic is positive in the first pixel so as to resume said brightness mode. The reset voltage refers to a voltage of (common voltage±threshold voltage), that is, one reset voltage presents at each of the two sides of the common voltage respectively.

step 504, after the step 503, of applying a format voltage to the second pixel and vertically arranging a liquid crystal whose dielectric permittivity anisotropic is positive in the second pixel without alignment film so as to form a brightness mode.

step 505, after the step 504, of applying a driving voltage to the second pixel and forming a plurality of domains in the second pixel, so as to control the degree of the optical rotation by arranging the liquid crystal according to a specific rule under the control of the driving voltage, and to control the gray scale of the liquid crystal panel by the polarizer on both sides of the liquid crystal panel, and finally enabling the first pixel to display a corresponding bright point.

step 506, after the step 505, of applying a reset voltage to the second pixel and vertically rearranging the liquid crystal whose dielectric permittivity anisotropic is positive in the second pixel so as to resume said brightness mode.

By repeating the above steps, the bright point displayed by each pixel constitutes a full picture when all the pixels on the liquid crystal are scanned, hence the display for a full picture is achieved.

Each of the first to the fourth embodiment is the method which displays a picture with two stages, that is, a format stage for applying a format voltage and a display stage for applying a driving voltage. However, in the fifth embodiment, a reset stage of applying a reset voltage is added to the above method of two-stage display. The method of adding a reset stage allows each pixel to reform the original brightness mode after the display of a corresponding bright point, which is equivalent to insert a black picture between the respective pictures. Therefore, similar to the technique in which a black picture is inserted between the pictures so as to mitigate the streaking phenomenon, the effect of mitigating the streaking can be acquired, and no additional apparatus is needed.

In addition, in the fifth embodiment, the object of resetting can be realized through the format voltage at the reset stage. However, the principle for realizing reset through a voltage which is equal to or higher than the reset voltage is same as the principle for the driving method according to the fifth embodiment, thus the details thereof are omitted herein.

The Sixth Embodiment

Figure 6:
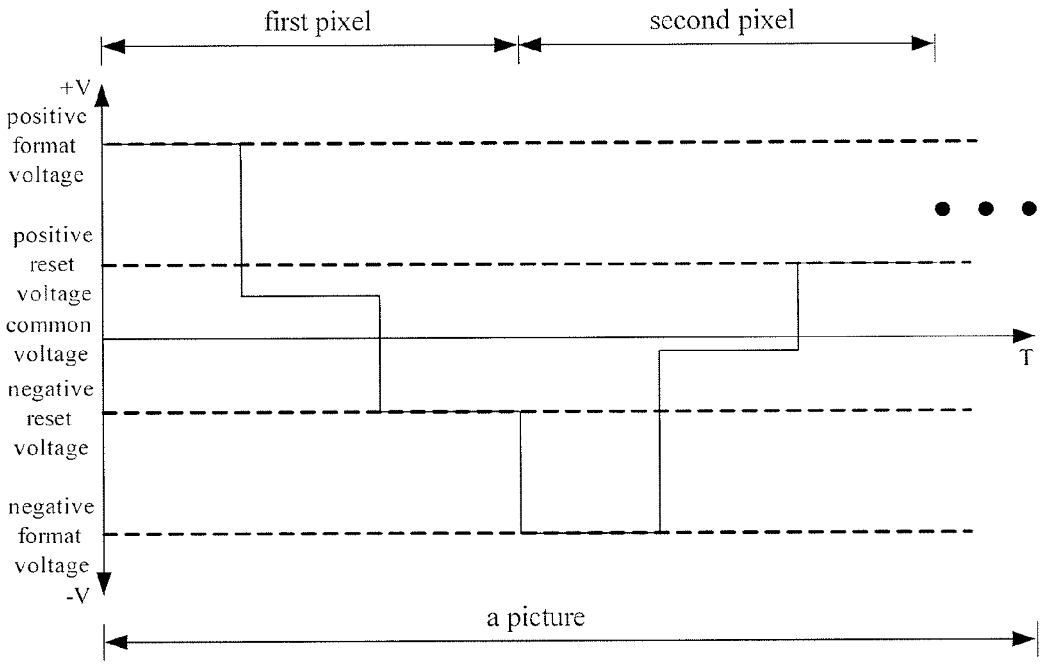
FIG. 6 is a schematic diagram for a driving method according to the sixth embodiment of the present invention.

FIG. 6 is a schematic diagram for a driving method according to the fifth embodiment of the present invention. As shown in FIG. 6, in the process of displaying each picture, driving the first pixel and the second pixel at the adjacent two rows and the same column particularly includes:

step 601 of applying a positive format voltage to the first pixel and vertically arranging a liquid crystal whose dielectric permittivity anisotropic is positive in the first pixel without alignment film so as to form a brightness mode. In an embodiment of the present invention, the voltage difference formed between the applied format voltage and common voltage is much larger than the threshold voltage for the liquid crystal, hence the liquid crystal molecules is forced to be vertically arranged under a strong electric field that is formed by the format voltage and the common voltage. Generally, the format voltage is provided by the pixel electrode on the array substrate, and the common voltage is provided by the common electrode on the color filter substrate.

step 602, after the step 601, of applying a positive driving voltage to the first pixel and forming a plurality of domains in the first pixel, so as to control the degree of the optical rotation by arranging the liquid crystal according to a specific rule under the control of the positive driving voltage, and to control the gray scale of the liquid crystal panel by the polarizer on both sides of the liquid crystal panel, and finally enabling the first pixel to display a corresponding bright point.

step 603, after the step 602, of applying a negative reset voltage to the first pixel and vertically rearranging the liquid crystal whose dielectric permittivity anisotropic is positive in the first pixel so as to resume said brightness mode. The reset voltage refers to a voltage of (common voltage±threshold voltage), that is, one reset voltage presents at each of the two sides of the common voltage respectively in which the voltage of (common voltage+threshold voltage) is a positive reset voltage, and the voltage of (common voltage−threshold voltage) is a negative reset voltage.

step 604, after the step 603, of applying a negative format voltage to the second pixel and vertically arranging a liquid crystal whose dielectric permittivity anisotropic is positive in the second pixel without alignment film so as to form a brightness mode.

step 605, after the step 604, of applying a negative driving voltage to the second pixel and forming a plurality of domains in the second pixel, so as to control the degree of the optical rotation by arranging the liquid crystal according to a specific rule under the control of negative driving voltage and to control the gray scale of the liquid crystal panel by the polarizer on both sides of the liquid crystal panel, and finally enabling the first pixel to display a corresponding bright point.

step 606, after the step 605, of applying a positive reset voltage to the second pixel and vertically rearranging the liquid crystal whose dielectric permittivity anisotropic is positive in the second pixel so as to resume said brightness mode.

By repeating the above steps, the bright point displayed by each pixel constitutes a full picture when all the pixels on the liquid crystal are scanned, hence the display for a full picture is achieved.

The driving method according to the sixth embodiment employs a polarity reversal means of 《++−−−+》. Therefore, when this method is applied to a liquid crystal panel which has odd rows of pixels, the object of driving and resetting the liquid crystal can be realized through the driving voltage and the reset voltage whose polarities are opposite to each other in the process of displaying a picture, thus enabling the liquid crystal to rapidly enter the reset state after the pixel has finished displaying a corresponding bright point. This method also can be applied to a liquid crystal panel which has even rows of pixels. However, for one pixel, when the former reset stage is changed into the latter format stage, there exists a phenomenon that the former reset voltage is opposite to the latter format voltage in polarity, thus it is possible to cause a defect due to the excess change of the voltage.

In addition, the driving method according to the sixth embodiment employs a polarity reversal means of 《++−−−+》. However, the principle for the driving method of employing a polarity reversal means of 《−−+++−》 is same as that of the sixth embodiment, thus the details thereof are omitted herein.

The Seventh Embodiment

Figure 7:
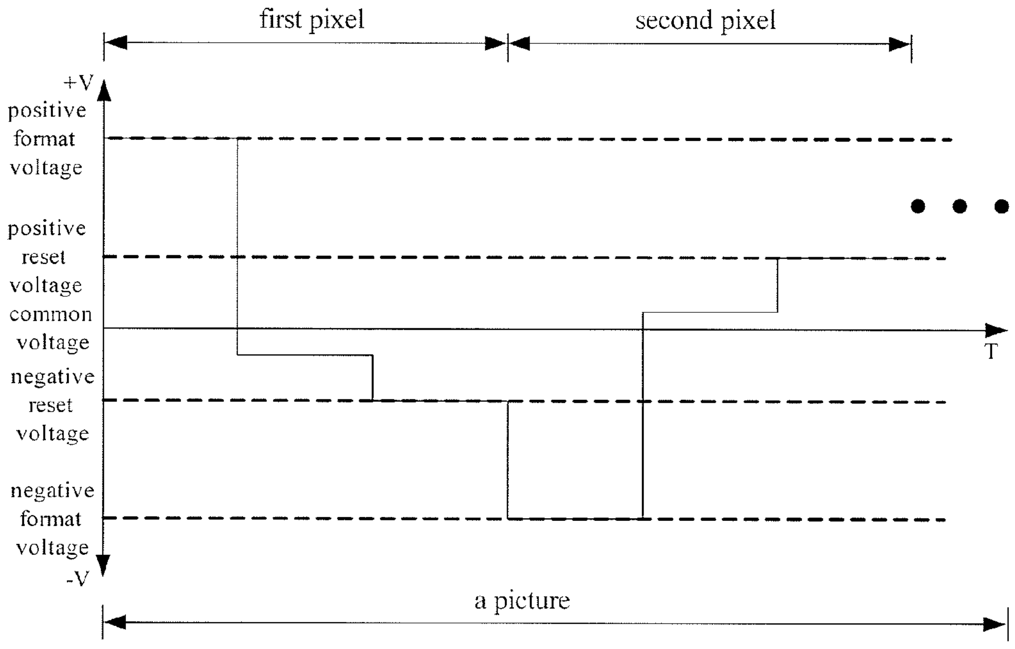
FIG. 7 is a schematic diagram for a driving method according to the seventh embodiment of the present invention.

FIG. 7 is a schematic diagram for a driving method according to the seventh embodiment of the present invention. As shown in FIG. 7, in the process of displaying each picture, driving the first pixel and the second pixel at the adjacent two rows and the same column particularly includes:

step 701 of applying a positive format voltage to the first pixel and vertically arranging a liquid crystal whose dielectric permittivity anisotropic is positive in the first pixel without alignment film so as to form a brightness mode. In an embodiment of the present invention, the voltage difference formed between the applied format voltage and common voltage is much larger than the threshold voltage for the liquid crystal, hence the liquid crystal molecules is forced to be vertically arranged under a strong electric field that is formed by the format voltage and the common voltage. Generally, the format voltage is provided by the pixel electrode on the array substrate, and the common voltage is provided by the common electrode on the color filter substrate.

step 702, after the step 701, of applying a negative driving voltage to the first pixel and forming a plurality of domains in the first pixel, so as to control the degree of the optical rotation by arranging the liquid crystal according to a specific rule under the control of the negative driving voltage, and to control the gray scale of the liquid crystal panel by the polarizer on both sides of the liquid crystal panel, and finally enabling the first pixel to display a corresponding bright point.

step 703, after the step 702, of applying a negative reset voltage to the first pixel and vertically rearranging the liquid crystal whose dielectric permittivity anisotropic is positive in the first pixel so as to resume said brightness mode. The reset voltage refers to a voltage of (common voltage+threshold voltage), that is, one reset voltage presents at each of the two sides of the common voltage respectively in which the voltage of (common voltage+threshold voltage) is a positive reset voltage, and the voltage of (common voltage−threshold voltage) is a negative reset voltage.

step 704, after the step 703, of applying a negative format voltage to the second pixel and vertically arranging a liquid crystal whose dielectric permittivity anisotropic is positive in the second pixel without alignment film so as to form a brightness mode.

step 705, after the step 704, of applying a positive driving voltage to the second pixel and forming a plurality of domains in the second pixel, so as to control the degree of the optical rotation by arranging the liquid crystal according to a specific rule under the control of positive driving voltage and to control the gray scale of the liquid crystal panel by the polarizer on both sides of the liquid crystal panel, and finally enabling the first pixel to display a corresponding bright point.

step 706, after the step 705, of applying a positive reset voltage to the second pixel and vertically rearranging the liquid crystal whose dielectric permittivity anisotropic is positive in the second pixel so as to resume said brightness mode.

By repeating the above steps, the bright point displayed by each pixel constitutes a full picture when all the pixels on the liquid crystal are scanned, hence the display for a full picture is achieved.

The driving method according to the seventh embodiment employs a polarity reversal means of 《+−−−++》. Therefore, when this method is applied to a liquid crystal panel which has odd rows of pixels, the object of formatting and driving the liquid crystal can be realized through the format voltage and the driving voltage whose polarities are opposite to each other in the process of displaying a picture, thus enabling the pixel to rapidly change from the format stage into the driving stage. This method also can be applied to a liquid crystal panel which has even rows of pixels. However, for one pixel, when the former reset stage is changed into the latter format stage, there exists a phenomenon that the former reset voltage is opposite to the latter format voltage in polarity, thus it is possible to cause a defect due to the excess change of the voltage.

In addition, the driving method according to the seventh embodiment employs a polarity reversal means of 《+−−−++》. However, the principle for the driving method of employing a polarity reversal means of 《−+++−−》 is same as that of the seventh embodiment, thus the details thereof are omitted herein.

The Eighth Embodiment

Figure 8:
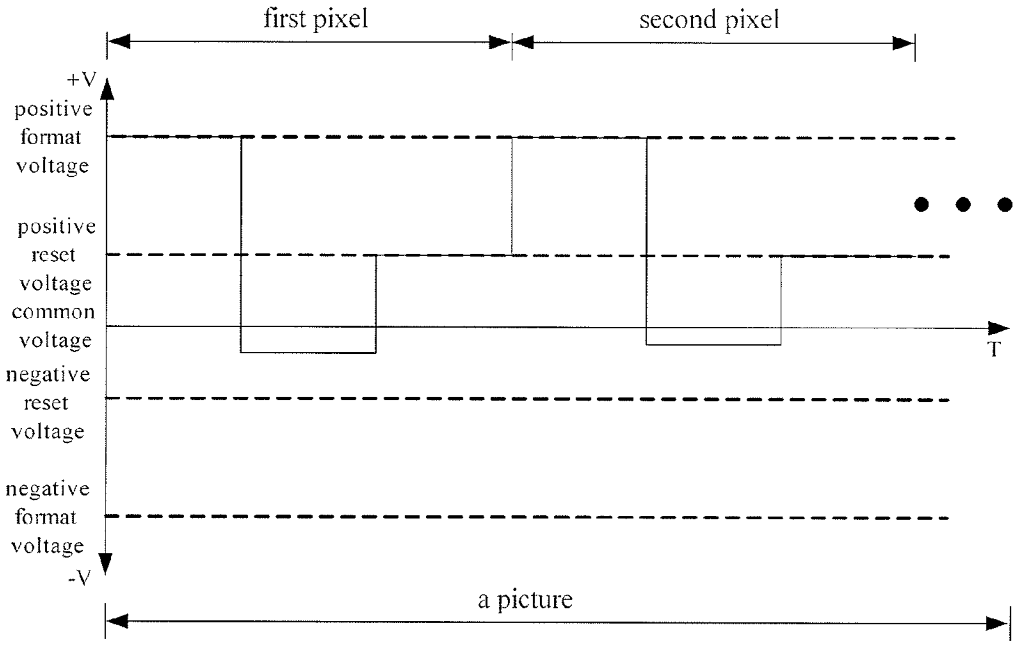
FIG. 8 is a schematic diagram for a driving method according to the eighth embodiment of the present invention.

FIG. 8 is a schematic diagram for a driving method according to the eighth embodiment of the present invention. As shown in FIG. 8, in the process of displaying each picture, driving the first pixel and the second pixel at the adjacent two rows and the same column particularly includes:

step 801 of applying a positive format voltage to the first pixel and vertically arranging a liquid crystal whose dielectric permittivity anisotropic is positive in the first pixel without alignment film so as to form a brightness mode. In an embodiment of the present invention, the voltage difference formed between the applied format voltage and common voltage is much larger than the threshold voltage for the liquid crystal, hence the liquid crystal molecules is forced to be vertically arranged under a strong electric field that is formed by the format voltage and the common voltage. Generally, the format voltage is provided by the pixel electrode on the array substrate, and the common voltage is provided by the common electrode on the color filter substrate.

step 802, after the step 801, of applying a negative driving voltage to the first pixel and forming a plurality of domains in the first pixel, so as to control the degree of the optical rotation by arranging the liquid crystal according to a specific rule under the control of the negative driving voltage, and to control the gray scale of the liquid crystal panel by the polarizer on both sides of the liquid crystal panel, and finally enabling the first pixel to display a corresponding bright point.

step 803, after the step 802, of applying a positive reset voltage to the first pixel and vertically rearranging the liquid crystal whose dielectric permittivity anisotropic is positive in the first pixel so as to resume said brightness mode. The reset voltage refers to a voltage of (common voltage±threshold voltage), that is, one reset voltage presents at each of the two sides of the common voltage respectively in which the voltage of (common voltage+threshold voltage) is a positive reset voltage, and the voltage of (common voltage−threshold voltage) is a negative reset voltage.

step 804, after the step 803, of applying a positive format voltage to the second pixel and vertically arranging a liquid crystal whose dielectric permittivity anisotropic is positive in the second pixel without alignment film so as to form a brightness mode.

step 805, after the step 804, of applying a negative driving voltage to the second pixel and forming a plurality of domains in the second pixel, so as to control the degree of the optical rotation by arranging the liquid crystal according to a specific rule under the control of the negative driving voltage, and to control the gray scale of the liquid crystal panel by the polarizer on both sides of the liquid crystal panel, and finally enabling the first pixel to display a corresponding bright point.

step 806, after the step 805, of applying a positive reset voltage to the second pixel and vertically rearranging the liquid crystal whose dielectric permittivity anisotropic is positive in the second pixel so as to resume said brightness mode.

By repeating the above steps, the bright point displayed by each pixel constitutes a full picture when all the pixels on the liquid crystal are scanned, hence the display for a full picture is achieved.

The driving method according to the eighth embodiment employs a polarity reversal means of 《+−++−+》. Therefore, when this method is applied to a liquid crystal panel which has odd or even rows of pixels, the object of formatting and driving the liquid crystal can be realized through the format voltage and the driving voltage whose polarities are opposite to each other in the process of displaying a picture, thus enabling the pixel to rapidly change from the format stage into the driving stage, and also enabling the pixel to rapidly change from the driving stage into the reset stage.

In addition, the driving method according to the eighth embodiment employs a polarity reversal means of 《+−++−+》. However, the principle for the driving method of employing a polarity reversal means of 《−+−−+−》 is same as that of the eighth embodiment, thus the details thereof are omitted herein.

The Ninth Embodiment

Figure 9:
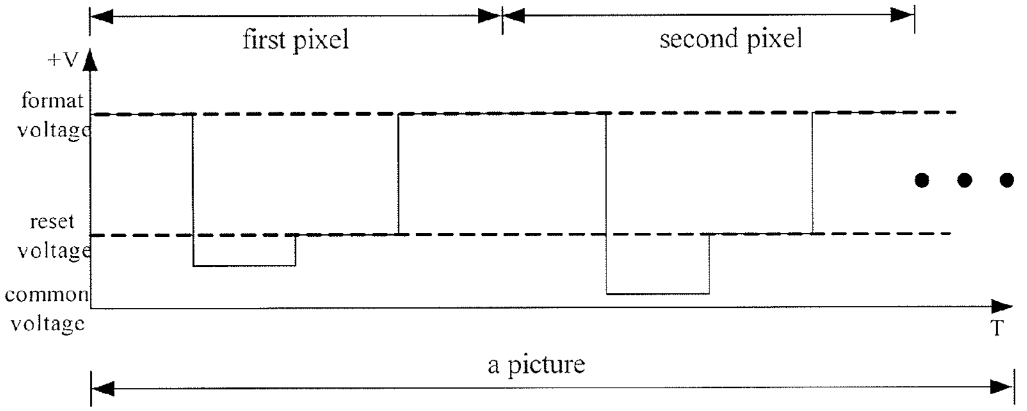
FIG. 9 is a schematic diagram for a driving method according to the ninth embodiment of the present invention.

FIG. 9 is a schematic diagram for a driving method according to the ninth embodiment of the present invention. As shown in FIG. 9, in the process of displaying each picture, driving the first pixel and the second pixel at the adjacent two rows and the same column includes:

step 901 of applying a format voltage to the first pixel and vertically arranging a liquid crystal whose dielectric permittivity anisotropic is positive in the first pixel without alignment film so as to form a brightness mode. In an embodiment of the present invention, the voltage difference formed between the applied format voltage and common voltage is much larger than the threshold voltage for the liquid crystal, hence the liquid crystal molecules is forced to be vertically arranged under a strong electric field that is formed by the format voltage and the common voltage. Generally, the format voltage is provided by the pixel electrode on the array substrate, and the common voltage is provided by the common electrode on the color filter substrate.

step 902, after the step 901, of applying a driving voltage to the first pixel and forming a plurality of domains in the first pixel, so as to control the degree of the optical rotation by arranging the liquid crystal according to a specific rule under the control of driving voltage and to control the gray scale of the liquid crystal panel by the polarizer on both sides of the liquid crystal panel, and finally enabling the first pixel to display a corresponding bright point.

step 903, after the step 902, of applying a reset voltage to the first pixel and vertically rearranging the liquid crystal whose dielectric permittivity anisotropic is positive in the first pixel so as to resume said brightness mode. The reset voltage refers to a voltage of (common voltage±threshold voltage), that is, one reset voltage presents at each of the two sides of the common voltage respectively.

step 904, after the step 903, of applying a format voltage to the first pixel and maintaining the original brightness mode with the format voltage after the first pixel is reverted to the original brightness mode with the reset voltage.

step 905, after the step 904, of applying a format voltage to the second pixel and vertically arranging a liquid crystal whose dielectric permittivity anisotropic is positive in the second pixel without alignment film so as to form a brightness mode.

step 906, after the step 905, of applying a driving voltage to the second pixel and forming a plurality of domains in the second pixel, so as to control the degree of the optical rotation by arranging the liquid crystal according to a specific rule under the control of the driving voltage, and to control the gray scale of the liquid crystal panel by the polarizer on both sides of the liquid crystal panel, and finally enabling the first pixel to display a corresponding bright point.

step 907, after the step 906, of applying a reset voltage to the second pixel and vertically rearranging the liquid crystal whose dielectric permittivity anisotropic is positive in the second pixel so as to resume said brightness mode.

step 908, after the step 907, of applying a format voltage to the second pixel and maintaining the original brightness mode with the format voltage after the second pixel is reverted to the original brightness mode with the reset voltage.

By repeating the above steps, the bright point displayed by each pixel constitutes a full picture when all the pixels on the liquid crystal are scanned, hence the display for a full picture is achieved.

Each of the fifth to the eighth embodiment is the method which displays a picture with three stages, that is, a format stage for applying a format voltage, a display stage for applying a driving voltage and a reset stage for applying a reset voltage. However, in the ninth embodiment, a maintenance stage of reapplying a format voltage is added to the above method of three stages display. The method of adding the maintenance stage can mitigate a defect of, when a storage capacitance in the pixel is used to maintain the brightness mode at the time period when each pixel has finished displaying a corresponding bright point and waits to display a next bright point, failing to properly maintain the brightness mode due to the decay of the storage capacitance, that is, a defect that a black picture is not a pure black picture when this black picture is inserted between the respective pictures, thus the display quality for the picture can be further improved.

The Tenth Embodiment

Figure 10:
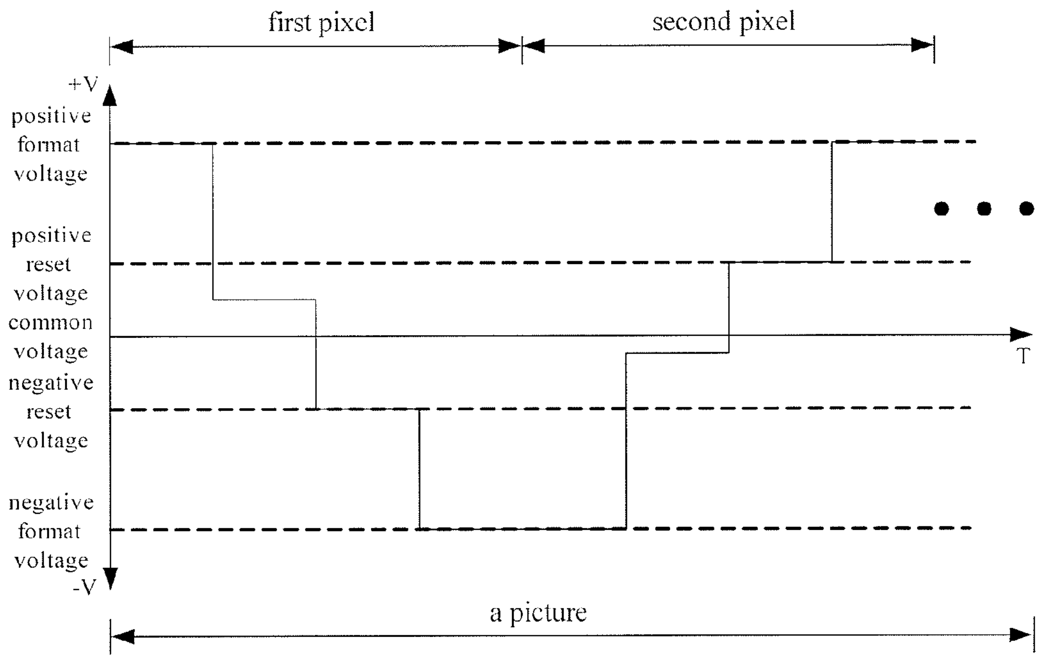
FIG. 10 is a schematic diagram for a driving method according to the tenth embodiment of the present invention.

FIG. 10 is a schematic diagram for a driving method according to the tenth embodiment of the present invention. As shown in FIG. 10, in the process of displaying each picture, driving the first pixel and the second pixel at the adjacent two rows and the same column particularly includes:

step 1001 of applying a positive format voltage to the first pixel and vertically arranging a liquid crystal whose dielectric permittivity anisotropic is positive in the first pixel without alignment film so as to form a brightness mode. In an embodiment of the present invention, the voltage difference formed between the applied format voltage and common voltage is much larger than the threshold voltage for the liquid crystal, hence the liquid crystal molecules is forced to be vertically arranged under a strong electric field that is formed by the format voltage and common voltage. Generally, the format voltage is provided by the pixel electrode on the array substrate, and the common voltage is provided by the common electrode on the color filter substrate.

step 1002, after the step 1001, of applying a positive driving voltage to the first pixel and forming a plurality of domains in the first pixel, so as to control the degree of the optical rotation by arranging the liquid crystal according to a specific rule under the control of the positive driving voltage, and to control the gray scale of the liquid crystal panel by the polarizer on both sides of the liquid crystal panel, and finally enabling the first pixel to display a corresponding bright point.

step 1003, after the step 1002, of applying a negative reset voltage to the first pixel and vertically rearranging the liquid crystal whose dielectric permittivity anisotropic is positive in the first pixel so as to resume said brightness mode. The reset voltage refers to a voltage of (common voltage±threshold voltage), that is, one reset voltage presents at each of the two sides of the common voltage respectively in which the voltage of (common voltage+threshold voltage) is a positive reset voltage, and the voltage of (common voltage−threshold voltage) is a negative reset voltage.

step 1004, after the step 1003, of applying a negative format voltage to the first pixel and maintaining the original brightness mode with the negative format voltage after the first pixel is reverted to the original brightness mode with the negative reset voltage.

step 1005, after the step 1004, of applying a negative format voltage to the second pixel and vertically arranging a liquid crystal whose dielectric permittivity anisotropic is positive in the second pixel without alignment film so as to form a brightness mode.

step 1006, after the step 1005, of applying a negative driving voltage to the second pixel and forming a plurality of domains in the second pixel, so as to control the degree of the optical rotation by arranging the liquid crystal according to a specific rule under the control of the negative driving voltage, and to control the gray scale of the liquid crystal panel by the polarizer on both sides of the liquid crystal panel, and finally enabling the first pixel to display a corresponding bright point.

step 1007, after the step 1006, of applying a positive reset voltage to the second pixel and vertically rearranging the liquid crystal whose dielectric permittivity anisotropic is positive in the second pixel so as to resume said brightness mode.

step 1008, after the step 1007, of applying a positive format voltage to the second pixel and maintaining the original brightness mode with the positive format voltage after the second pixel is reverted to the original brightness mode with the positive reset voltage.

By repeating the above steps, the bright point displayed by each pixel constitutes a full picture when all the pixels on the liquid crystal are scanned, hence the display for a full picture is achieved.

The driving method according to the tenth embodiment employs a polarity reversal means of 《++−−−−++》. Therefore, when this method is applied to a liquid crystal panel which has odd rows of pixels, the object of driving and resetting the liquid crystal can be realized through the driving voltage and the reset voltage whose polarities are opposite to each other in the process of displaying a picture, thus enabling the liquid crystal to rapidly enter the reset state after the pixel has finished displaying a corresponding bright point. This method also can be applied to a liquid crystal panel which has even rows of pixels. However, for one pixel, when the former reset stage is changed into the latter format stage, there exists a phenomenon that the former reset voltage is opposite to the latter format voltage in polarity, thus it is possible to cause a defect due to the excess change of the voltage.

In addition, the driving method according to the tenth embodiment employs a polarity reversal means of 《++−−−−++》. However, the principle for the driving method of employing a polarity reversal means of 《−−++++−−》 is same as that of the tenth embodiment, thus the details thereof are omitted herein.

The Eleventh Embodiment

Figure 11:
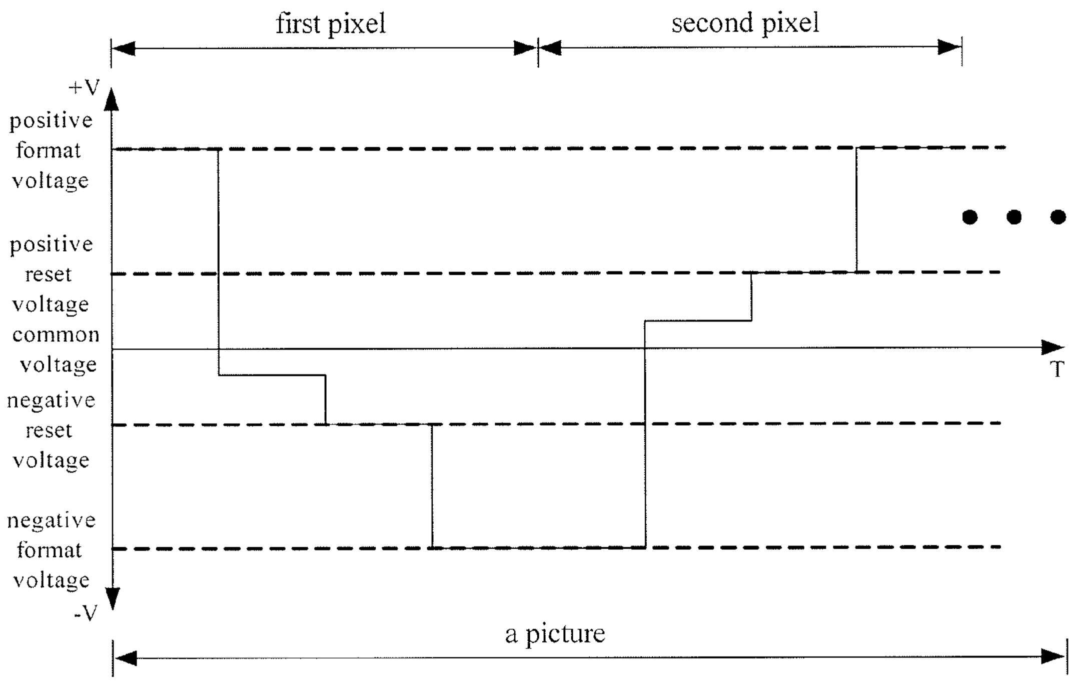
FIG. 11 is a schematic diagram for a driving method according to the eleventh embodiment of the present invention.

FIG. 11 is a schematic diagram for a driving method according to the eleventh embodiment of the present invention. As shown in FIG. 11, in the process of displaying each picture, driving the first pixel and the second pixel at the adjacent two rows and the same column particularly includes:

step 1101 of applying a positive format voltage to the first pixel and vertically arranging a liquid crystal whose dielectric permittivity anisotropic is positive in the first pixel without alignment film so as to form a brightness mode. In an embodiment of the present invention, the voltage difference formed between the applied format voltage and common voltage is much larger than the threshold voltage for the liquid crystal, hence the liquid crystal molecules is forced to be vertically arranged under a strong electric field that is formed by the format voltage and the common voltage. Generally, the format voltage is provided by the pixel electrode on the array substrate, and the common voltage is provided by the common electrode on the color filter substrate.

step 1102, after the step 1101, of applying a negative driving voltage to the first pixel and forming a plurality of domains in the first pixel, so as to control the degree of the optical rotation by arranging the liquid crystal according to a specific rule under the control of the negative driving voltage, and to control the gray scale of the liquid crystal panel by the polarizer on both sides of the liquid crystal panel, and finally enabling the first pixel to display a corresponding bright point.

step 1103, after the step 1102, of applying a negative reset voltage to the first pixel and vertically rearranging the liquid crystal whose dielectric permittivity anisotropic is positive in the first pixel so as to resume said brightness mode. The reset voltage refers to a voltage of (common voltage±threshold voltage), that is, one reset voltage presents at each of the two sides of the common voltage respectively in which the voltage of (common voltage+threshold voltage) is a positive reset voltage, and the voltage of (common voltage−threshold voltage) is a negative reset voltage.

step 1104, after the step 1103, of applying a negative format voltage to the first pixel and maintaining the original brightness mode with the negative format voltage after the first pixel is reverted to the original brightness mode with the negative reset voltage.

step 1105, after the step 1104, of applying a negative format voltage to the second pixel and vertically arranging a liquid crystal whose dielectric permittivity anisotropic is positive in the second pixel without alignment film so as to form a brightness mode.

step 1106, after the step 1105, of applying a positive driving voltage to the second pixel and forming a plurality of domains in the second pixel, so as to control the degree of the optical rotation by arranging the liquid crystal according to a specific rule under the control of the positive driving voltage, and to control the gray scale of the liquid crystal panel by the polarizer on both sides of the liquid crystal panel, and finally enabling the first pixel to display a corresponding bright point.

step 1107, after the step 1106, of applying a positive reset voltage to the second pixel and vertically rearranging the liquid crystal whose dielectric permittivity anisotropic is positive in the second pixel so as to resume said brightness mode.

step 1108, after the step 1107, of applying a positive format voltage to the second pixel and maintaining the original brightness mode with the positive format voltage after the second pixel is reverted to the original brightness mode with the positive reset voltage.

By repeating the above steps, the bright point displayed by each pixel constitutes a full picture when all the pixels on the liquid crystal are scanned, hence the display for a full picture is achieved.

The driving method according to the eleventh embodiment employs a polarity reversal means of 《+−−−−+++》. Therefore, when this method is applied to a liquid crystal panel which has odd rows of pixels, the object of formatting and driving the liquid crystal can be realized through the format voltage and the driving voltage whose polarities are opposite to each other in the process of displaying a picture, thus enabling the pixel to rapidly change from the format stage into the driving stage. This method also can be applied to a liquid crystal panel which has even rows of pixels. However, for one pixel, when the former reset stage is changed into the latter format stage, there exists a phenomenon that the former reset voltage is opposite to the latter format voltage in polarity, thus it is possible to cause a defect due to the excess change of the voltage.

In addition, the driving method according to the eleventh embodiment employs a polarity reversal means of 《+−−−−+++》. However, the principle for the driving method of employing a polarity reversal means of 《−++++−−−》 is same as that of the eleventh embodiment, thus the details thereof are omitted herein.

The Twelfth Embodiment

Figure 12:
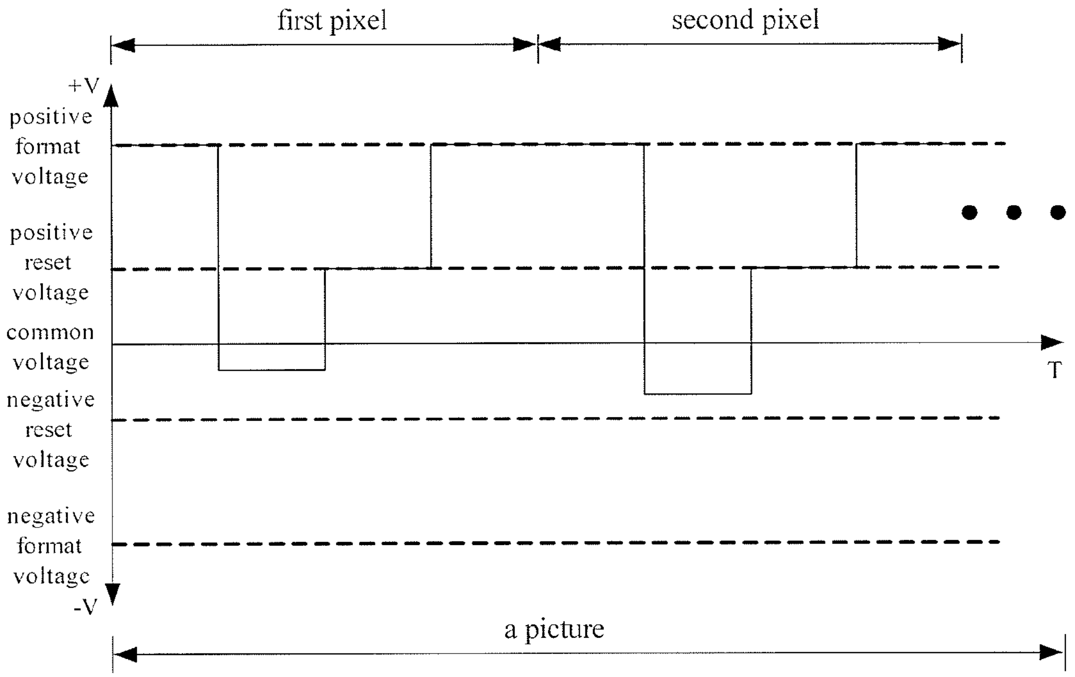
FIG. 12 is a schematic diagram for a driving method according to the twelfth embodiment of the present invention.

FIG. 12 is a schematic diagram for a driving method according to the twelfth embodiment of the present invention. As shown in FIG. 12, in the process of displaying each picture, driving the first pixel and the second pixel at the adjacent two rows and the same column particularly includes:

step 1201 of applying a positive format voltage to the first pixel and vertically arranging a liquid crystal whose dielectric permittivity anisotropic is positive in the first pixel without alignment film so as to form a brightness mode. In an embodiment of the present invention, the voltage difference formed between the applied format voltage and common voltage is much larger than the threshold voltage for the liquid crystal, hence the liquid crystal molecules is forced to be vertically arranged under a strong electric field that is formed by the format voltage and the common voltage. Generally, the format voltage is provided by the pixel electrode on the array substrate, and the common voltage is provided by the common electrode on the color filter substrate.

step 1202, after the step 1201, of applying a negative driving voltage to the first pixel and forming a plurality of domains in the first pixel, so as to control the degree of the optical rotation by arranging the liquid crystal according to a specific rule under the control of the negative driving voltage, and to control the gray scale of the liquid crystal panel by the polarizer on both sides of the liquid crystal panel, and finally enabling the first pixel to display a corresponding bright point.

step 1203, after the step 1202, of applying a positive reset voltage to the first pixel and vertically rearranging the liquid crystal whose dielectric permittivity anisotropic is positive in the first pixel so as to resume said brightness mode. The reset voltage refers to a voltage of (common voltage±threshold voltage), that is, one reset voltage presents at each of the two sides of the common voltage respectively in which the voltage of (common voltage+threshold voltage) is a positive reset voltage, and the voltage of (common voltage−threshold voltage) is a negative reset voltage.

step 1204, after the step 1203, of applying a positive format voltage to the first pixel and maintaining the original brightness mode with the positive format voltage after the first pixel is reverted to the original brightness mode with the positive reset voltage.

step 1205, after the step 1204, of applying a positive format voltage to the second pixel and vertically arranging a liquid crystal whose dielectric permittivity anisotropic is positive in the second pixel without alignment film so as to form a brightness mode.

step 1206, after the step 1205, of applying a negative driving voltage to the second pixel and forming a plurality of domains in the second pixel, so as to control the degree of the optical rotation by arranging the liquid crystal according to a specific rule under the control of the negative driving voltage, and to control the gray scale of the liquid crystal panel by the polarizer on both sides of the liquid crystal panel, and finally enabling the first pixel to display a corresponding bright point.

step 1207, after the step 1206, of applying a positive reset voltage to the second pixel and vertically rearranging the liquid crystal whose dielectric permittivity anisotropic is positive in the second pixel so as to resume said brightness mode.

step 1208, after the step 1207, of applying a positive format voltage to the second pixel and maintaining the original brightness mode with the positive format voltage after the second pixel is reverted to the original brightness mode with the positive reset voltage.

By repeating the above steps, the bright point displayed by each pixel constitutes a full picture when all the pixels on the liquid crystal are scanned, hence the display for a full picture is achieved.

The driving method according to the twelfth embodiment employs a polarity reversal means of 《+−+++−++》. Therefore, when this method is applied to a liquid crystal panel which has odd or even rows of pixels, the object of formatting and driving the liquid crystal can be realized through the format voltage and the driving voltage whose polarities are opposite to each other in the process of displaying a picture, thus enabling the pixel to rapidly change from the format stage into the driving stage, and also enabling the pixel to rapidly change from the driving stage into the reset stage.

In addition, the driving method according to the twelfth embodiment employs a polarity reversal means of 《+−+++−++》. However, the principle for the driving method of employing a polarity reversal means of 《−+−−−+−−》 is same as that of the twelfth embodiment, thus the details thereof are omitted herein.

Each of the first to the fourth embodiment is the method which displays with two stages, wherein the first embodiment is the embodiment that without the polarity reversal, and each of the second to the fourth embodiment is the embodiment with the polarity reversal. Each of the fifth to the eighth embodiment is the method which displays with three stages, wherein the fifth embodiment is the embodiment that without the polarity reversal, and each of the sixth to the eighth embodiment is the embodiment with the polarity reversal. Each of the ninth to the twelfth embodiment is the method which displays with four stages, wherein the ninth embodiment is the embodiment that without the polarity reversal, and each of the tenth to the twelfth embodiment is the embodiment with the polarity reversal. Although the polarity reversals in respective stages have not been exhausted in the above respective embodiments, with the disclosed embodiments, those skilled in the art should fully comprehend the embodiments for the other polarity reversal which is based on the driving method for the display with the three stages and fourth stages.

In addition, it should be explained that the first pixel and the second pixel in the each of the first embodiment to the twelfth embodiment refer to two pixels at adjacent two rows and the same column in the liquid crystal panel which displays a picture with a progressive method. For the liquid crystal panel which displays a picture with an interlace method, the first pixel and the second pixel refer to two pixels at the same column among two rows of pixels interlaced by one row. For the liquid crystal panel which displays a picture with the other scanning method, the first pixel and the second pixel should be defined according to the time sequence for driving. Also, the first pixel may be one pixel or a plurality of pixels, and the second pixel may be one pixel or a plurality of pixels.

In each of the first to the twelfth embodiment, the dielectric permittivity anisotropic of the liquid crystal being used ranges from 4 to 8. The birefringence of the liquid crystal being used ranges from 0.36 to 0.45, and it is preferable to use the liquid crystal whose birefringence ranges from 0.40 to 0.45.

Finally, it should be explained that the above embodiments is only for explaining the technical solution of the present invention, and not for limitation. Although the present invention has been described in details with reference to the embodiments, it should be appreciated by those skilled in the art that the technical solution of the present invention can be modified or equivalently replaced without departing from the spirit and scope of the technical solution in the present invention.

What is claimed is:

1. A driving method for a vertical electric field type of the liquid crystal display, including in the process of displaying each picture, driving a first pixel and a second pixel at adjacent two rows and the same column comprising:

step 101 of applying a format voltage to the first pixel and vertically arranging a liquid crystal whose dielectric permittivity anisotropic is positive in the first pixel without alignment film so as to form a brightness mode;

step 102 of applying a driving voltage to the first pixel and forming a plurality of domains in the first pixel so as to display a picture;

step 103 of applying a format voltage to the second pixel and vertically arranging a liquid crystal whose dielectric permittivity anisotropic is positive in the second pixel without alignment film so as to form a brightness mode; and step 104 of applying a driving voltage to the second pixel and forming a plurality of domains in the second pixel so as to display a picture.

2. The driving method for the vertical electric field type of the liquid crystal display according to the claim 1, wherein, in the process of displaying each picture, driving the first pixel and the second pixel at the adjacent two rows and the same column particularly comprising:

step 201 of applying a positive format voltage to the first pixel and vertically arranging a liquid crystal whose dielectric permittivity anisotropic is positive in the first pixel without alignment film so as to form a brightness mode;

step 202 of applying a positive driving voltage to the first pixel and forming a plurality of domains in the first pixel so as to display a picture;

step 203 of applying a negative format voltage to the second pixel and vertically arranging a liquid crystal whose dielectric permittivity anisotropic is positive in the second pixel without alignment film so as to form a brightness mode; and step 204 of applying a negative driving voltage to the second pixel and forming a plurality of domains in the second pixel so as to display a picture.

3. The driving method for the vertical electric field type of the liquid crystal display according to the claim 1, wherein, in the process of displaying each picture, driving the first pixel and the second pixel at the adjacent two rows and the same column particularly comprising:

step 301 of applying a positive format voltage to the first pixel and vertically arranging a liquid crystal whose dielectric permittivity anisotropic is positive in the first pixel without alignment film so as to form a brightness mode;

step 302 of applying a negative driving voltage to the first pixel and forming a plurality of domains in the first pixel so as to display a picture;

step 303 of applying a negative format voltage to the second pixel and vertically arranging a liquid crystal whose dielectric permittivity anisotropic is positive in the second pixel without alignment film so as to form a brightness mode; and step 304 of applying a positive driving voltage to the second pixel and forming a plurality of domains in the second pixel so as to display a picture.

4. The driving method for the vertical electric field type of the liquid crystal display according to the claim 1, wherein, in the process of displaying each picture, driving the first pixel and the second pixel at the adjacent two rows and the same column particularly comprising:

step 401 of applying a positive format voltage to the first pixel and vertically arranging a liquid crystal whose dielectric permittivity anisotropic is positive in the first pixel without alignment film so as to form a brightness mode;

step 402 of applying a negative driving voltage to the first pixel and forming a plurality of domains in the first pixel so as to display a picture;

step 403 of applying a positive format voltage to the second pixel and vertically arranging a liquid crystal whose dielectric permittivity anisotropic is positive in the second pixel without alignment film so as to form a brightness mode; and step 404 of applying a negative driving voltage to the second pixel and forming a plurality of domains in the second pixel so as to display a picture.

5. The driving method for the vertical electric field type of the liquid crystal display according to the claim 1, wherein, after the step 102, the method further comprising:

step 503 of applying a reset voltage to the first pixel and vertically rearranging the liquid crystal whose dielectric permittivity anisotropic is positive in the first pixel so as to resume said brightness mode;

after the step 104, the method further comprising:

step 506 of applying a reset voltage to the second pixel and vertically rearranging the liquid crystal whose dielectric permittivity anisotropic is positive in the second pixel so as to resume said brightness mode.

6. The driving method for the vertical electric field type of the liquid crystal display according to the claim 5, wherein, in the process of displaying each picture, driving the first pixel and the second pixel at the adjacent two rows and the same column particularly comprising:

step 601 of applying a positive format voltage to the first pixel and vertically arranging a liquid crystal whose dielectric permittivity anisotropic is positive in the first pixel without alignment film so as to form a brightness mode;

step 602 of applying a positive driving voltage to the first pixel and forming a plurality of domains in the first pixel so as to display a picture;

step 603 of applying a negative reset voltage to the first pixel and vertically rearranging the liquid crystal whose dielectric permittivity anisotropic is positive in the first pixel so as to resume said brightness mode;

step 604 of applying a negative format voltage to the second pixel and vertically arranging a liquid crystal whose dielectric permittivity anisotropic is positive in the second pixel without alignment film so as to form a brightness mode;

step 605 of applying a negative driving voltage to the second pixel and forming a plurality of domains in the second pixel so as to display a picture; and step 606 of applying a positive reset voltage to the second pixel and vertically rearranging the liquid crystal whose dielectric permittivity anisotropic is positive in the second pixel so as to resume said brightness mode.

7. The driving method for the vertical electric field type of the liquid crystal display according to the claim 5, wherein, in the process of displaying each picture, driving the first pixel and the second pixel at the adjacent two rows and the same column particularly comprising:

step 701 of applying a positive format voltage to the first pixel and vertically arranging a liquid crystal whose dielectric permittivity anisotropic is positive in the first pixel without alignment film so as to form a brightness mode;

step 702 of applying a negative driving voltage to the first pixel and forming a plurality of domains in the first pixel so as to display a picture;

step 703 of applying a negative reset voltage to the first pixel and vertically rearranging the liquid crystal whose dielectric permittivity anisotropic is positive in the first pixel so as to resume said brightness mode;

step 704 of applying a negative format voltage to the second pixel and vertically arranging a liquid crystal whose dielectric permittivity anisotropic is positive in the second pixel without alignment film so as to form a brightness mode;

step 705 of applying a positive driving voltage to the second pixel and forming a plurality of domains in the second pixel so as to display a picture; and step 706 of applying a positive reset voltage to the second pixel and vertically rearranging the liquid crystal whose dielectric permittivity anisotropic is positive in the second pixel so as to resume said brightness mode.

8. The driving method for the vertical electric field type of the liquid crystal display according to the claim 5, wherein, in the process of displaying each picture, driving the first pixel and the second pixel at the adjacent two rows and the same column particularly comprising:

step 801 of applying a positive format voltage to the first pixel and vertically arranging a liquid crystal whose dielectric permittivity anisotropic is positive in the first pixel without alignment film so as to form a brightness mode;

step 802 of applying a negative driving voltage to the first pixel and forming a plurality of domains in the first pixel so as to display a picture;

step 803 of applying a positive reset voltage to the first pixel and vertically rearranging the liquid crystal whose dielectric permittivity anisotropic is positive in the first pixel so as to resume said brightness mode;

step 804 of applying a positive format voltage to the second pixel and vertically arranging a liquid crystal whose dielectric permittivity anisotropic is positive in the second pixel without alignment film so as to form a brightness mode;

step 805 of applying a negative driving voltage to the second pixel and forming a plurality of domains in the second pixel so as to display a picture; and step 806 of applying a positive reset voltage to the second pixel and vertically rearranging the liquid crystal whose dielectric permittivity anisotropic is positive in the second pixel so as to resume said brightness mode.

9. The driving method for the vertical electric field type of the liquid crystal display according to the claim 5, wherein, after the step 503, the method further comprising:

step 904 of applying a format voltage to the first pixel and maintaining said brightness mode in the first pixel;

after the step 506, the method further comprising:

step 908 of applying a format voltage to the second pixel and maintaining said brightness mode in the second pixel.

10. The driving method for the vertical electric field type of the liquid crystal display according to the claim 9, wherein, in the process of displaying each picture, driving the first pixel and the second pixel at the adjacent two rows and the same column particularly comprising:

step 1001 of applying a positive format voltage to the first pixel and vertically arranging a liquid crystal whose dielectric permittivity anisotropic is positive in the first pixel without alignment film so as to form a brightness mode;

step 1002 of applying a positive driving voltage to the first pixel and forming a plurality of domains in the first pixel so as to display a picture;

step 1003 of applying a negative reset voltage to the first pixel and vertically rearranging the liquid crystal whose dielectric permittivity anisotropic is positive in the first pixel so as to resume said brightness mode;

step 1004 of applying a negative format voltage to the first pixel and maintaining said brightness mode in the first pixel;

step 1005 of applying a negative format voltage to the second pixel and vertically arranging a liquid crystal whose dielectric permittivity anisotropic is positive in the second pixel without alignment film so as to form a brightness mode;

step 1006 of applying a negative driving voltage to the second pixel and forming a plurality of domains in the second pixel so as to display a picture;

step 1007 of applying a positive reset voltage to the second pixel and vertically rearranging the liquid crystal whose dielectric permittivity anisotropic is positive in the second pixel so as to resume said brightness mode; and step 1008 of applying a positive format voltage to the second pixel and maintaining said brightness mode in the second pixel.

11. The driving method for the vertical electric field type of the liquid crystal display according to the claim 9, wherein, in the process of displaying each picture, driving the first pixel and the second pixel at the adjacent two rows and the same column particularly comprising:

step 1101 of applying a positive format voltage to the first pixel and vertically arranging a liquid crystal whose dielectric permittivity anisotropic is positive in the first pixel without alignment film so as to form a brightness mode;

step 1102 of applying a negative driving voltage to the first pixel and forming a plurality of domains in the first pixel so as to display a picture;

step 1103 of applying a negative reset voltage to the first pixel and vertically rearranging the liquid crystal whose dielectric permittivity anisotropic is positive in the first pixel so as to resume said brightness mode;

step 1104 of applying a negative format voltage to the first pixel and maintaining said brightness mode in the first pixel;

step 1105 of applying a negative format voltage to the second pixel and vertically arranging a liquid crystal whose dielectric permittivity anisotropic is positive in the second pixel without alignment film so as to form a brightness mode;

step 1106 of applying a positive driving voltage to the second pixel and forming a plurality of domains in the second pixel so as to display a picture;

step 1107 of applying a positive reset voltage to the second pixel and vertically rearranging the liquid crystal whose dielectric permittivity anisotropic is positive in the second pixel so as to resume said brightness mode; and step 1108 of applying a positive format voltage to the second pixel and maintaining said brightness mode in the second pixel.

12. The driving method for the vertical electric field type of the liquid crystal display according to the claim 9, wherein, in the process of displaying each picture, driving the first pixel and the second pixel at the adjacent two rows and the same column particularly comprising:

step 1201 of applying a positive format voltage to the first pixel and vertically arranging a liquid crystal whose dielectric permittivity anisotropic is positive in the first pixel without alignment film so as to form a brightness mode;

step 1202 of applying a negative driving voltage to the first pixel and forming a plurality of domains in the first pixel so as to display a picture;

step 1203 of applying a positive reset voltage to the first pixel and vertically rearranging the liquid crystal whose dielectric permittivity anisotropic is positive in the first pixel so as to resume said brightness mode;

step 1204 of applying a positive format voltage to the first pixel and maintaining said brightness mode in the first pixel;

step 1205 of applying a positive format voltage to the second pixel and vertically arranging a liquid crystal whose dielectric permittivity anisotropic is positive in the second pixel without alignment film so as to form a brightness mode;

step 1206 of applying a negative driving voltage to the second pixel and forming a plurality of domains in the second pixel so as to display a picture;

step 1207 of applying a positive reset voltage to the second pixel and vertically rearranging the liquid crystal whose dielectric permittivity anisotropic is positive in the second pixel so as to resume said brightness mode;

step 1208 of applying a positive format voltage to the second pixel and maintaining said brightness mode in the second pixel.

13. A vertical electric field type of the liquid crystal display which is driven according to the driving method of the claim 1.

14. A vertical electric field type of the liquid crystal display which is driven according to the driving method of the claim 2.

15. A vertical electric field type of the liquid crystal display which is driven according to the driving method of the claim 5.

16. A vertical electric field type of the liquid crystal display which is driven according to the driving method of the claim 6.

17. A vertical electric field type of the liquid crystal display which is driven according to the driving method of the claim 7.

18. A vertical electric field type of the liquid crystal display which is driven according to the driving method of the claim 9.

19. A vertical electric field type of the liquid crystal display which is driven according to the driving method of the claim 10.

20. A vertical electric field type of the liquid crystal display which is driven according to the driving method of the claim 11.

* * * * *